(12) United States Patent
Radzik

(10) Patent No.: US 9,052,038 B2
(45) Date of Patent: Jun. 9, 2015

(54) SWAY BRACE RETAINING CLIP

(71) Applicant: Mueller International, LLC, Atlanta, GA (US)

(72) Inventor: Joseph G. Radzik, West Warwick, RI (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 13/917,455

(22) Filed: Jun. 13, 2013

(65) Prior Publication Data
US 2014/0367530 A1 Dec. 18, 2014

(51) Int. Cl.
*F16B 7/04* (2006.01)
*F16L 3/12* (2006.01)

(52) U.S. Cl.
CPC .......... *F16L 3/1207* (2013.01); *Y10T 29/49959* (2015.01)

(58) Field of Classification Search
CPC ............... F16B 1/00; F16B 2/08; F16B 2/24; F16B 2/00; F16B 2/02; F16B 7/00; F16B 7/04; F16B 7/044; F16B 7/0493; F16B 7/0453; F16B 7/0473; F16B 7/0486; F16B 9/00; F16B 9/02; F16B 9/023; F16B 17/00; F16B 17/002; F16B 17/004; F16B 17/006; F16B 17/008; F16L 3/02; B23P 11/00; E04C 2/42
USPC ............. 248/70, 72, 73, 74.4, 228.1, 313, 61, 248/62, 68.1, 67.7, 74.1, 63, 56, 58, 228.6, 248/226.11, 65, 229.25, 230.6, 231.71, 248/74.5, 230.1, 229.15, 219.3, 219.4; 52/127.2, 703, 745.21, 167.1, 167.2, 52/167.3; 24/298, 302, 486; 138/106, 107; 29/525.11, 525.01, 525.02, 525.05, 29/897; 403/362; 256/47, 48, 54, 55, 12.5
See application file for complete search history.

(56) References Cited

U.S. PATENT DOCUMENTS

| | | | | | |
|---|---|---|---|---|---|
| 499,549 | A | * | 6/1893 | Hunter et al. | 248/72 |
| 1,778,700 | A | * | 10/1930 | Whittier et al. | 248/72 |
| 2,079,034 | A | * | 5/1937 | Parkin | 24/135 R |
| 2,164,094 | A | * | 6/1939 | Tallman | 248/61 |
| 2,252,820 | A | * | 8/1941 | Tallman | 248/61 |
| 2,675,201 | A | * | 4/1954 | Friel | 248/228.3 |
| 2,733,034 | A | * | 1/1956 | Tormo | 248/72 |
| 2,820,656 | A | * | 1/1958 | Jensen | 403/399 |
| 2,929,121 | A | * | 3/1960 | Tinnerman | 403/397 |
| 3,107,932 | A | * | 10/1963 | Johnson Set al. | 403/176 |
| 3,521,842 | A | * | 7/1970 | Opperthauser | 248/74.2 |
| 3,570,794 | A | * | 3/1971 | Kirschner | 248/74.4 |
| 3,721,412 | A | * | 3/1973 | Kindorf | 48/73 |
| 4,301,638 | A | * | 11/1981 | Schmidgall | 52/687 |
| 4,421,238 | A | * | 12/1983 | Patton | 211/85.11 |
| 5,028,020 | A | * | 7/1991 | Sundholm | 248/74.4 |
| 5,295,646 | A | * | 3/1994 | Roth | 248/58 |

(Continued)

OTHER PUBLICATIONS

Erico; "Fire Sprinkler Hanging & Bracing Products", Copyright 2012, 128 pgs.

*Primary Examiner* — Nkeisha Smith
(74) *Attorney, Agent, or Firm* — Taylor English Duma LLP

(57) ABSTRACT

A sway brace clamp includes a rod having a first rod end, a second rod end, a first bracing end, and a second bracing end, the rod defining a pipeline connection portion sized to accept a pipeline and a brace pipe connecting portion sized to accept a brace pipe; and a retaining clip connecting the first bracing end of the rod to the second bracing end of the rod.

7 Claims, 4 Drawing Sheets

(56) References Cited

U.S. PATENT DOCUMENTS

| | | |
|---|---|---|
| 5,740,994 A | 4/1998 | Laughlin |
| 5,806,813 A * | 9/1998 | Binelli .................. 248/73 |
| 5,897,088 A | 4/1999 | Kirschner |
| 5,961,248 A * | 10/1999 | Tourtellotte .................. 403/400 |
| 5,967,480 A * | 10/1999 | Kirschner .................. 248/300 |
| 6,098,942 A * | 8/2000 | Heath .................. 248/228.6 |
| 6,227,757 B1 * | 5/2001 | Delouvee et al. .................. 403/400 |
| 6,273,372 B1 * | 8/2001 | Heath .................. 248/62 |
| 6,334,285 B1 | 1/2002 | Kirschner |
| 6,454,232 B1 * | 9/2002 | Roth .................. 248/228.1 |
| 6,464,422 B1 | 10/2002 | Kirschner |
| 6,508,441 B1 * | 1/2003 | Kirschner .................. 248/62 |
| 6,581,884 B1 * | 6/2003 | Gretz .................. 248/74.1 |
| 6,634,606 B2 | 10/2003 | Heath |
| 6,672,545 B1 * | 1/2004 | Persing .................. 248/58 |
| 6,755,379 B2 | 6/2004 | Kirschner |
| 6,783,102 B2 | 8/2004 | Kirschner |
| 7,090,173 B2 * | 8/2006 | Lussier .................. 248/58 |
| 7,234,283 B2 * | 6/2007 | Russo .................. 52/665 |
| 7,845,597 B2 * | 12/2010 | Gatta .................. 248/58 |
| 7,931,244 B1 * | 4/2011 | Sipe .................. 248/229.2 |
| 8,534,625 B2 * | 9/2013 | Heath et al. .................. 248/226.11 |
| 2002/0066836 A1 * | 6/2002 | Heath .................. 248/74.1 |
| 2006/0024127 A1 * | 2/2006 | Heath .................. 403/150 |
| 2007/0170317 A1 * | 7/2007 | Heath .................. 248/62 |
| 2010/0146906 A1 * | 6/2010 | Heath .................. 52/741.3 |
| 2012/0305723 A1 * | 12/2012 | Heath et al. .................. 248/228.1 |

* cited by examiner

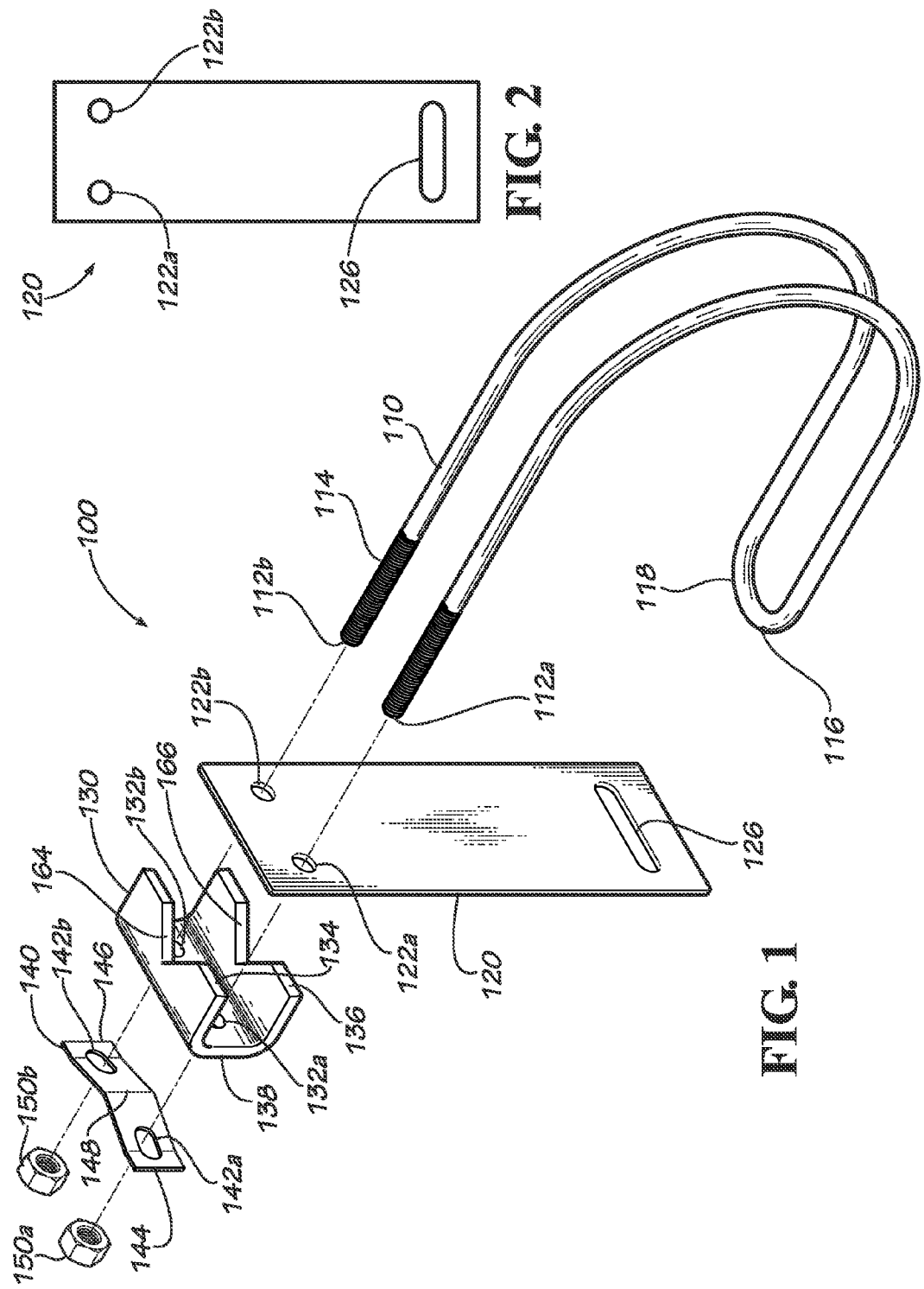

SWAY BRACE RETAINING CLIP

TECHNICAL FIELD

This disclosure relates to piping. More specifically, this disclosure relates to sway braces for piping.

BACKGROUND

Piping, such as sprinkler system piping, may be mounted in a structure by sway bracing. Sway bracing may be used to rigidly brace piping systems subject to sway and seismic disturbances by connecting a pipeline to the structure with a sway brace. Underwriters Laboratory Standards for sway bracing requires that sway bracing not exhibit deformation or slippage under various test loads. Some sway braces include a clamp and a brace pipe, the clamp coupling the pipeline to the brace pipe. The brace pipe is thereby attached to the structure.

SUMMARY

Disclosed is a sway brace clamp including a rod having a first rod end, a second rod end, a first bracing end, and a second bracing end, the rod defining a pipeline connection portion sized to accept a pipeline and a brace pipe connecting portion sized to accept a brace pipe; and a retaining clip connecting the first bracing end of the rod to the second bracing end of the rod.

Also disclosed is a sway brace including a brace pipe, the brace pipe attachable to a structure; a sway brace clamp coupled to the brace pipe, the sway brace clamp including: a rod having a first rod end, a second rod end, a first bracing end, and a second bracing end, the rod defining a pipeline connection portion sized to accept a pipeline and a brace pipe connecting portion sized to accept the brace pipe; and a retaining clip connecting the first bracing end of the rod to the second bracing end of the rod.

Also disclosed is a method of coupling a brace pipe to a pipeline with a sway brace clamp, the sway brace clamp including a rod and a retaining clip, the rod having a first rod end, a second rod end, a first bracing end, and a second bracing end, the rod defining a pipeline connection portion and a brace pipe connecting portion, the method including placing the rod around the pipeline with the pipeline resting in the pipeline connection portion of the rod; connecting the first bracing end of the rod to the second bracing end of the rod with the retaining clip; and placing the brace pipe in the brace pipe connecting portion of the rod.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 1 is a perspective exploded view of a sway brace clamp in accord with some embodiments of the current disclosure.

FIG. 2 is a side view of a retaining clip of a sway brace clamp, according to embodiments of the current disclosure.

DETAILED DESCRIPTION

Figure 3:
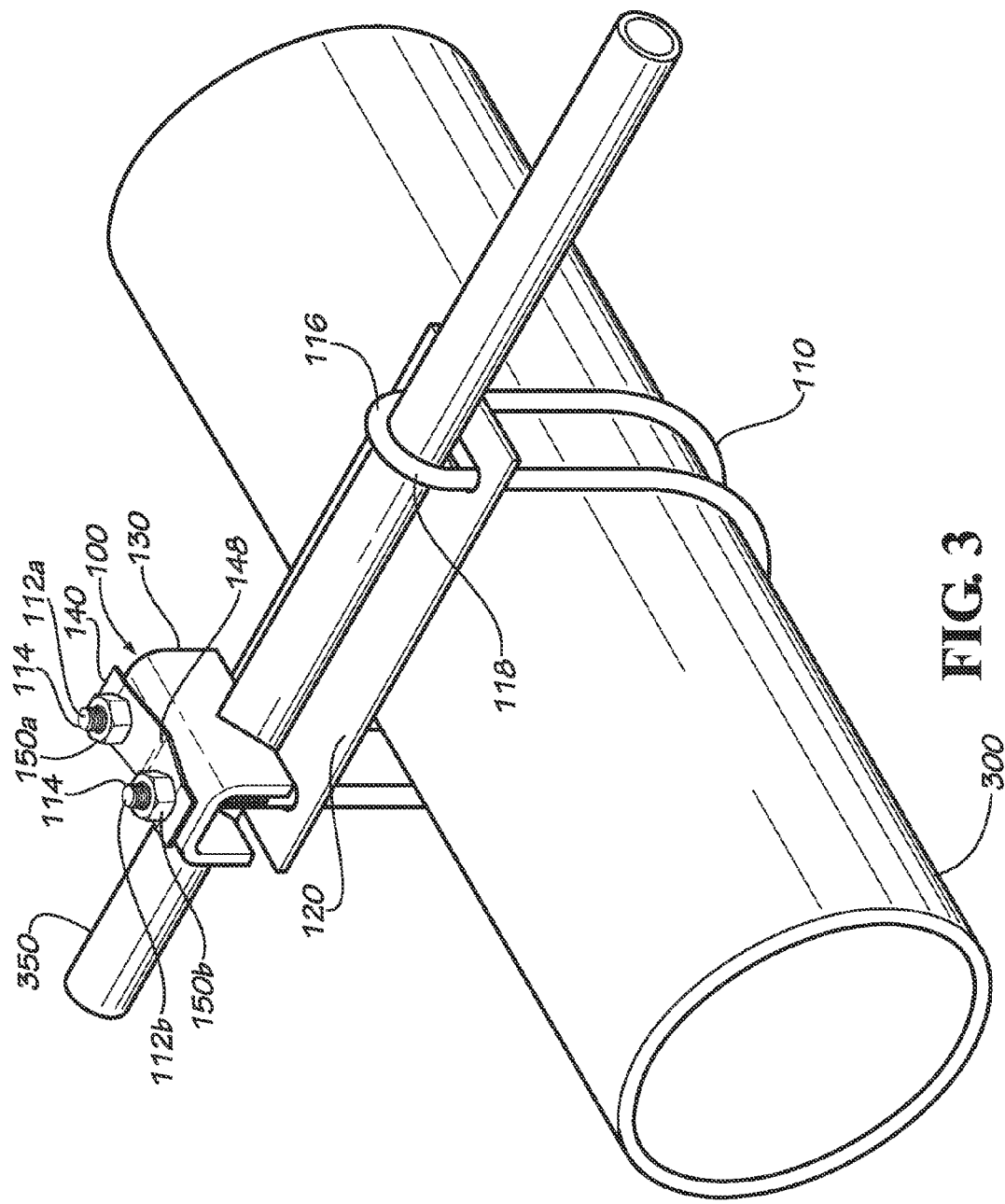
FIG. 3 is a perspective view of the sway brace clamp of FIG. 1 coupling a pipeline to a brace pipe.

Disclosed is a sway brace clamp and associated methods, systems, devices, and various apparatus. The sway brace clamp includes a rod and a retaining clip. It would be understood by one of skill in the art that the disclosed sway brace clamp is described in but a few exemplary embodiments among many. No particular terminology or description should be considered limiting on the disclosure or the scope of any claims issuing therefrom.

One embodiment of a sway brace clamp 100 is disclosed and described in FIG. 1. The sway brace clamp 100 includes a rod 110, a retaining clip 120, a clamp bar 130, a spring clamp 140, and hex nuts 150a,b. The rod 110 includes a first rod end 112a, a second rod end 112b, and a rod bend 118 between the first rod end 112a and the second rod end 112b. The rod bend 118 spaces the first rod end 112a from the second rod end 112b. In various embodiments, the first rod end 112a and the second rod end 112b are threaded to allow the first rod end 112a and the second rod end 112b to engage the hex nuts 150a,b, respectively. The rod 110 also includes a first bracing end 114 and a second bracing end 116. In various embodiments, the first rod end 112a and the second rod end 112b form the first bracing end 114 and the rod bend 118 forms the second bracing end 116.

The retaining clip 120 includes a pair of through-holes 122a,b and a slot 126 defined therethrough. The through-holes 122a,b of the retaining clip 120 are sized to accept the first rod end 112a and the second rod end 112b, respectively, thereby accepting the first bracing end 114. The slot 126 is sized to accept the second bracing end 116 of the rod 110. The clamp bar 130 includes a pair of through-holes 132a,b defined therethrough. The through-holes 132a,b of the clamp bar 130 are also sized to accept the first rod end 112a and the second rod end 112b, respectively, thereby accepting the first bracing end 114. The spring clamp 140 includes a pair of through-holes 142a,b defined therethrough. The through-holes 142a,b of the spring clamp 140 are also sized to accept the first rod end 112a and the second rod end 112b, respectively, thereby accepting the first bracing end 114.

The clamp bar 130 also includes a back wall 138, an upper end 134, and a lower end 136. The back wall 138, upper end 134, and lower end 136 give the clamp bar 130 a U-shaped cross-section. An upper notch 164 is defined in the upper end 134 and a lower notch 166 is defined in the lower end 136. The spring clamp 140 includes a first end 144, a second end 146, and a middle ridge 148.

FIG. 2 shows a side view of the retaining clip 120. In the current embodiment, the retaining clip 120 is shaped like a rectangular plate, though the retaining clip 120 may be shaped differently in various embodiments. The retaining clip 120 links the first bracing end 114 and the second bracing end 116 of the rod 110 together to prevent the first bracing end 114 and the second bracing end 116 from moving away from each other. The retaining clip 120 thereby prevents deformation of the rod 110.

FIG. 3 shows a perspective view of the sway brace clamp 100 in use. As shown in FIG. 3, the sway brace clamp 100 couples a pipeline 300 to a brace pipe 350. The first rod end 112a and the second rod end 112b are shown extending through retaining clip 120, clamp bar 130, spring clamp 140, and hex nuts 150a,b with the threads of the first rod end 112a and the second rod end 112b engaging the hex nuts 150a,b, respectively. The upper notch 164 and the lower notch 166 are sized to accept the brace pipe 350. The middle ridge 148 biases the clamp bar 130 against the brace pipe 350 when the hex nuts 150a,b are tightened down on first rod end 112a and second rod end 112b, respectively. In addition, second bracing end 116 is sized to accept the brace pipe 350 in the rod bend 118. The brace pipe 350 fits between the first rod end 112a and the second rod end 112b. The rod 110 is also sized to accept the pipeline 300, such that the interaction of first bracing end 114 and second bracing end 116 with the brace pipe 350 holds the pipeline 300 in place relative to brace pipe 350. Retaining clip 120 fits between the pipeline 300 and the brace pipe 350.

Figure 4:
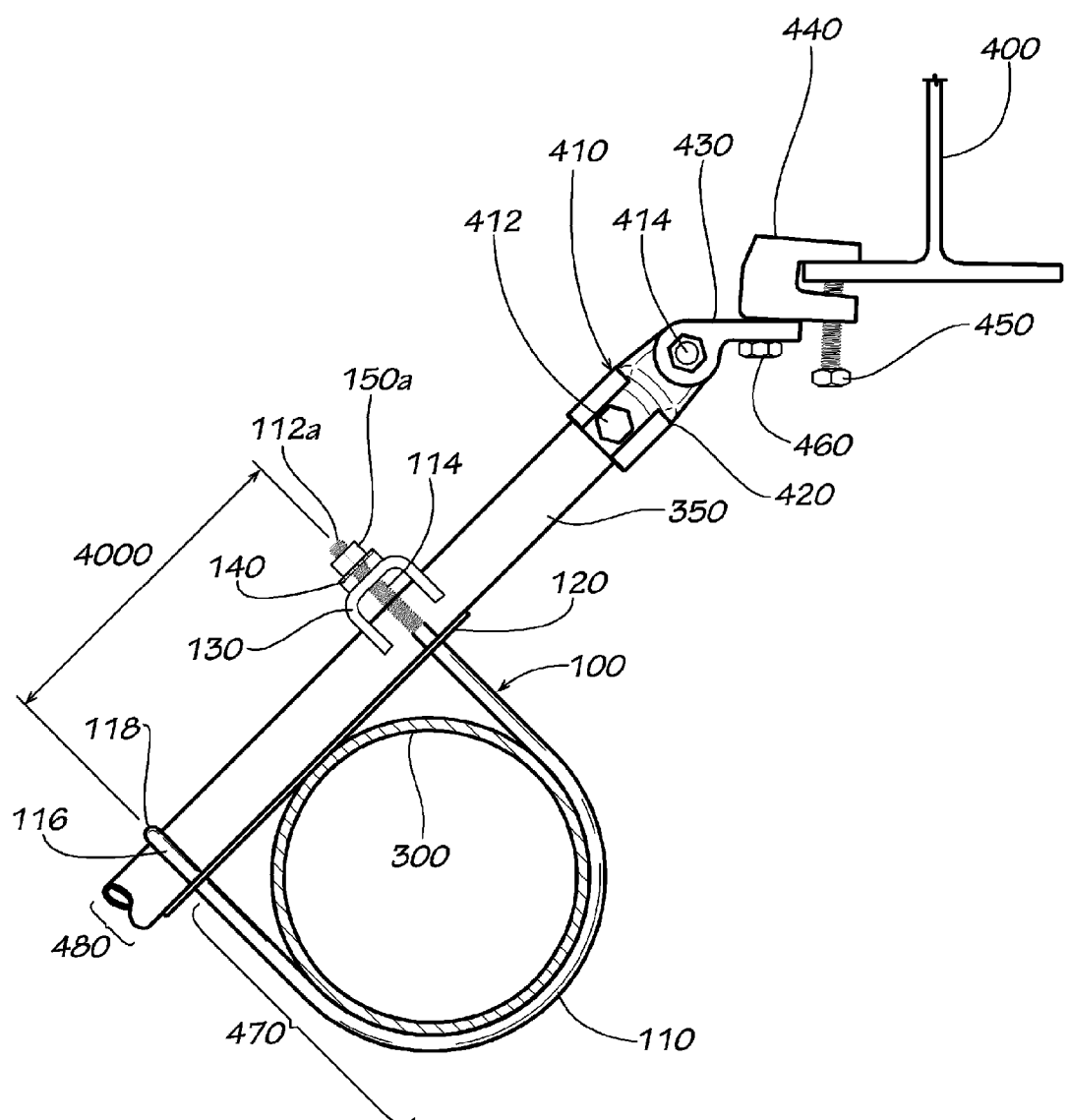
FIG. 4 is a side view of the sway brace clamp of FIG. 1 coupling a pipeline to a brace pipe attached to a structure.

FIG. 4 shows the pipeline 300, sway brace clamp 100, and brace pipe 350 mounted to a steel beam 400. As shown in FIG. 4, the brace pipe 350 is mounted to the steel beam 400 by a sway brace swivel attachment 410 bolted to a bar joist beam attachment 440 by a hex head cap screw 460. The sway brace swivel attachment 410 includes a pipe attachment portion 420 and a structure attachment portion 430 rotatably coupled to each other by a swivel bolt 414. The pipe attachment portion 420 is sized to accept brace pipe 350 and is coupled to the brace pipe 350 by a shear bolt 412. The structure attachment portion 430 is coupled to the bar joist beam attachment 440 by the hex head cap screw 460. A pair of shear bolts 450 couple the bar joist beam attachment 440 to the steel beam 400. The sway brace swivel attachment 410 allows the brace pipe 350 to be mounted at various angles, such as the angle shown in FIG. 4. In combination, the sway brace clamp 100, the brace pipe 350, the sway brace swivel attachment 410, and the bar joist beam attachment 440 form a sway brace, though other attachment mechanisms, sway brace clamps, and brace pipes may be used in various embodiments.

The steel beam 400 is part of a larger structure, such as a building. The pipeline 300, sway brace clamp 100, and brace pipe 350 may be mounted to the structure by any number of methods in various embodiments, such as by attaching the brace pipe 350 to a joist, a wooden beam or blocking, or into a concrete ceiling. In various embodiments, the structure attachment portion 430 of sway brace swivel attachment 410 may be directly bolted to a wooden beam or blocking or directly into a concrete ceiling, or the structure attachment portion 430 of sway brace swivel attachment 410 may be coupled to an attachment mechanism such as bar joist beam attachment 440. In various embodiments, the brace pipe 350 may be mounted to the structure using attachment mechanisms other than sway brace swivel attachment 410.

As shown in FIG. 4, the rod 110 of the sway brace clamp 100 defines a pipeline connection portion 470 and a brace pipe connection portion 480. The retaining clip 120 mounted between the pipeline 300 and the brace pipe 350 serves to prevent slippage of the brace pipe connection portion 480 along the brace pipe 350, linking the first bracing end 114 and the second bracing end 116 of the rod 110 together to prevent the first bracing end 114 and the second bracing end 116 from moving away from each other. The first bracing end 114 and the second bracing end 116 are spaced apart at a distance 4000. The retaining clip 120 prevents the distance 4000 from changing during movement of the pipeline 300 or the brace pipe 350, such as during a seismic event.

Figure 5:
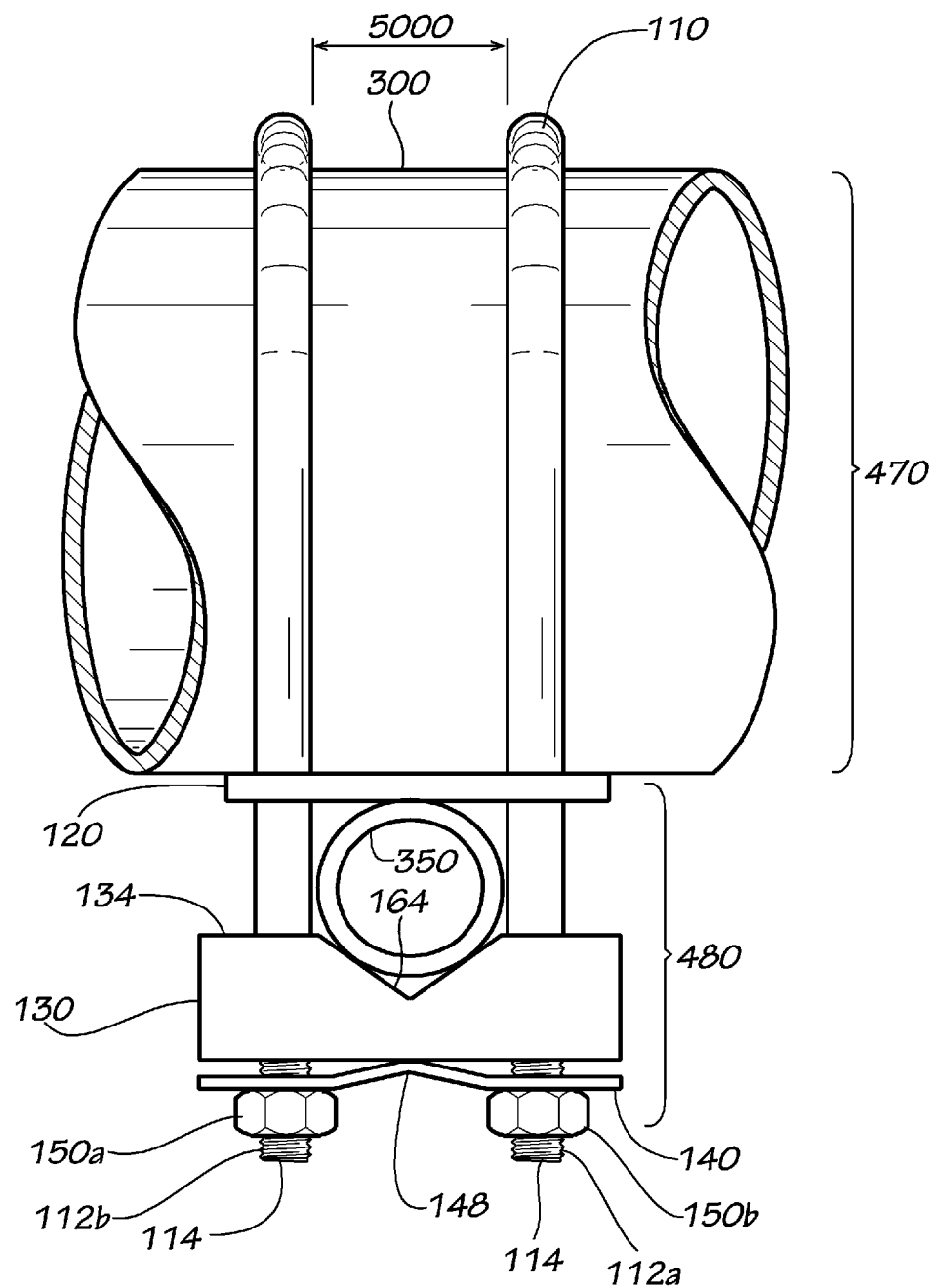
FIG. 5 is a top view of the sway brace clamp of FIG. 1 coupling a pipeline to a brace pipe.

FIG. 5 shows a top view of the sway brace clamp 100 coupling the pipeline 300 to the brace pipe 350. As shown in FIG. 5, the middle ridge 148 of the spring clamp 140 pushes against the center of the clamp bar 130 when the hex nuts 150a,b are tightened down, pushing the clamp bar 130 against the brace pipe 350 within upper notch 164 and lower notch 166. Brace pipe 350 thereby pushes against the retaining clip 120, which holds the pipeline 300 within the pipeline connection portion 470 of the rod 110. The retaining clip 120 mounted between the pipeline 300 and the brace pipe 350 also serves to prevent movement of the first rod end 112a from the second rod end 112b, linking the first rod end 112a and the second rod end 112b of the rod 110 together to prevent the first rod end 112a and the second rod end 112b from moving away from each other. The first rod end 112a and the second rod end 112b are spaced apart at a distance 5000. The retaining clip 120 prevents the distance 5000 from changing during movement of the pipeline 300 or the brace pipe 350, such as during a seismic event.

Without the retaining clip 120 connecting the first bracing end 114 to the second bracing end 116 and the first rod end 112a to the second rod end 112b, the rod 110 may deform during movement of the pipeline 300 or the brace pipe 350, which could cause the pipeline 300 to become disconnected from the brace pipe 350 and endanger the pipeline 300, the structure housing the pipeline 300, or people and property within the structure. Industry standards for pipelines installed in seismic zones thus require that sway bracing exhibit no deformation under test loads, and retaining clip 120 helps to prevent such deformation in the sway brace 100 by providing a direct link between the first bracing end 114, the second bracing end 116, the first rod end 112a, and the second rod end 112b.

In various embodiments, the sway brace clamp 100 may be installed on a pipeline 300 and a brace pipe 350 by placing the rod 110 around the pipeline 300, with the pipeline 300 resting in the pipeline connection portion 470. The retaining clip 120 may then be placed with the first rod end 112a and the second rod end 112b extending through the through-holes 122a,b and the rod bend 118 extending through the slot 126, thereby connecting the first bracing end 114 to the second bracing end 116. The brace pipe 350 may then be inserted into the second bracing end 116 and positioned between the first rod end 112a and the second rod end 112b. The clamp bar 130 and spring clamp 140 may then be placed on the first bracing end 114 by inserting the first rod end 112a and the second rod end 112b through the through-holes 132a,b of the clamp bar 130 and the through-holes 142a,b of the spring clamp 140 and tightened down with hex nuts 150a,b to rigidly couple the brace pipe 350 to the pipeline 300.

In various embodiments, the retaining clip 120 may be placed in various positions connecting the first bracing end 114 to the second bracing end 116, such as placing the retaining clip 120 on the opposite side of the brace pipe 350 from the pipeline 300 instead of in between the brace pipe 350 and the pipeline 300. In various embodiments, a sway brace clamp may include two rods, each rod bent to wrap around the pipeline 300 and spaced relative to each other such that the brace pipe 350 may fit between the rods, with the second bracing end held in place by a second clamp bar and a second spring clamp for the second bracing end held in place with a second pair of hex nuts.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A sway brace comprising:
   a brace pipe, the brace pipe attachable to a structure;
   a sway brace clamp coupled to the brace pipe, the sway brace clamp including:
      a rod having a first rod end, a second rod end, a first bracing end, and a second bracing end, the rod defining a pipeline connection portion sized to accept a pipeline and a brace pipe connecting portion sized to accept the brace pipe; and
      a retaining clip connecting the first bracing end of the rod to the second bracing end of the rod, wherein the retaining clip is a plate, the plate defining a slot, the second bracing end extending through the slot.

2. The sway brace of claim 1, wherein the retaining clip contacts the brace pipe.

3. The sway brace of claim 1, wherein the retaining clip connects the first bracing end of the rod to the second bracing end of the rod between the pipeline connection portion and the brace pipe connection portion of the rod, the retaining clip mountable between the brace pipe and the pipeline.

4. The sway brace of claim 1, wherein the plate defines a first through-hole and a second through-hole, the first rod end extending through the first through-hole and the second rod end extending through the second through-hole.

5. The sway brace of claim 1, wherein the first bracing end and the second bracing end extend through the plate.

6. The sway brace of claim 1, wherein the first rod end and the second rod end form the first bracing end, and wherein the second bracing end is formed from a bend in the rod.

7. The sway brace of claim 6, wherein the first rod end and the second rod end extend past the brace pipe on opposite sides of the brace pipe, and wherein the second bracing end wraps around the brace pipe.

* * * * *